United States Patent
Everitt et al.

[11] Patent Number: 5,880,645
[45] Date of Patent: Mar. 9, 1999

[54] ANALOG ADAPTIVE EQUALIZER WITH GAIN AND FILTER CORRECTION

[75] Inventors: James W. Everitt, Granite Bay; Paul J. Hurst, Vacaville; Daniel L. Ray, Sacramento, all of Calif.

[73] Assignee: Level One Communications, Inc., Sacramento, Calif.

[21] Appl. No.: 887,699

[22] Filed: Jul. 3, 1997

[51] Int. Cl.⁶ .................................................. H03H 7/30
[52] U.S. Cl. ........................ 333/18; 375/232; 333/28 R
[58] Field of Search ........................... 333/18, 28 R; 381/103; 375/232

[56] References Cited

U.S. PATENT DOCUMENTS

| | | | |
|---|---|---|---|
| 3,568,100 | 3/1971 | Tarbos | 333/18 |
| 3,578,914 | 5/1971 | Simonelli | 333/18 X |
| 3,798,576 | 3/1974 | Torpie et al. | 333/18 |
| 3,812,436 | 5/1974 | Fudemoto et al. | 333/18 |
| 3,824,501 | 7/1974 | Harris | 333/18 |
| 4,071,827 | 1/1978 | Koike et al. | 375/355 X |
| 4,170,758 | 10/1979 | Tamburelli | 375/220 |
| 4,468,786 | 8/1984 | Davis | 333/18 |
| 4,760,596 | 7/1988 | Agrawal et al. | 379/410 |
| 4,789,994 | 12/1988 | Randall et al. | 333/18 X |
| 4,887,278 | 12/1989 | Gupta | 379/394 X |
| 5,007,047 | 4/1991 | Sridhar et al. | 379/406 X |
| 5,014,263 | 5/1991 | Vairavan et al. | 379/406 X |
| 5,157,690 | 10/1992 | Buttle | 379/410 |
| 5,181,228 | 1/1993 | Takatori | 455/307 X |
| 5,214,671 | 5/1993 | Nakai | 333/18 X |
| 5,257,286 | 10/1993 | Ray | 333/18 X |
| 5,764,695 | 6/1998 | Nagaraj et al. | 375/232 |

*Primary Examiner*—Robert Pascal
*Assistant Examiner*—Justin P. Bettendorf
*Attorney, Agent, or Firm*—Merchant, Gould, Smith, Edell, Welter & Schmidt, P.A.

[57] ABSTRACT

The analog adaptive equalizer provides convergence of an error signal by decoupling the error canceller, the automatic gain control and the filter to provide truly adaptive error minimization. The invention includes an automatic gain control (AGC) circuit for providing broadband amplification of an input signal to generate an AGC output signal, a filter for receiving the AGC output signal and providing high frequency signal conditioning to generate a filter output signal, an error detection circuit for generating an error signal representing the difference between the filter output signal and an expected output signal and a calculator for receiving the error signal and providing a gain correction signal to the automatic gain circuit to adjust the gain of the automatic gain circuit and a filter control signal to adjust the filter range of the filter, the gain correction signal and the filter control signal being used to cancel the error signal. The calculator further comprises a first in, first out buffer for providing a history of the expected output signal to the calculator.

23 Claims, 4 Drawing Sheets

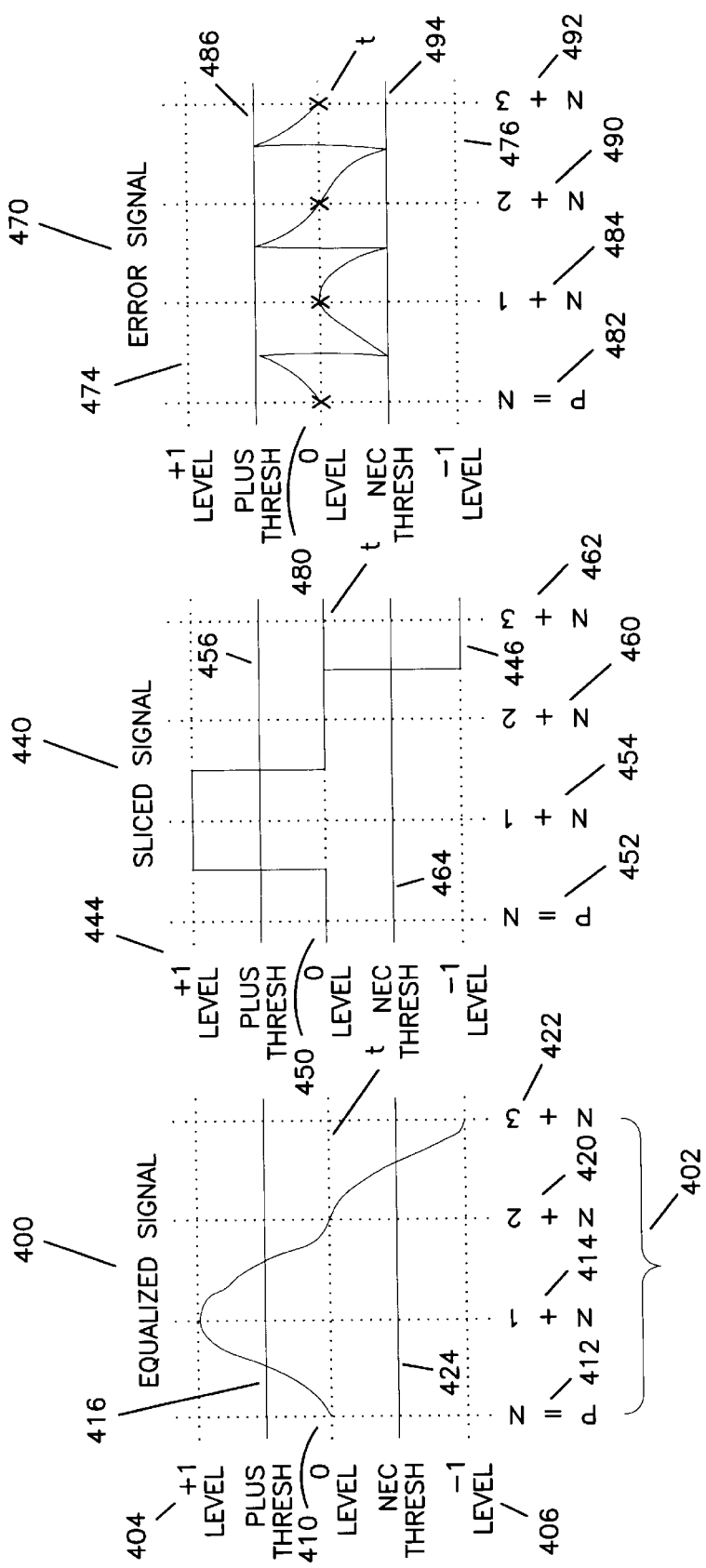

ANALOG ADAPTIVE EQUALIZER WITH GAIN AND FILTER CORRECTION

BACKGROUND OF THE INVENTION

1. Field of the Invention

This invention relates in general to an adaptive equalizer, and more particularly to an analog adaptive equalizer that provides convergence of an error signal by, decoupling the error canceller, the automatic gain control and the filter.

2. Description of Related Art

"Communication" is the exchange of thoughts, opinions, ideas, and information. It is the means to socialize, do business, educate, and entertain. Communication can take many forms, such as spoken words, written letters, or symbols. Although face to face communication is often desirable, it is often not possible due to geographical distance, time constraints, and an ever-increasing need for a high volume of information in today's society. It is for this reason that information, or data, is sent over communications "channels," via "signals."

A communications channel is a single path for transmitting an electrical signal, such as a twisted wire-pair cable, or a fiber optic line. A signal is a physical representation of data, such as the electrical pulses which are used to correspond to digital logic levels.

Signals are sent, or transmitted, in a tremendous variety of forms. For example, signals are used to send voice information over a telephone line; modems use signals to transmit data between computers; signals are constantly sent between the CPU and disk storage device in a personal computer; and signals representing images and sound are transmitted from a television camera on-site, to the television in a viewer's living room that could be thousands of miles away.

Signal distortion or degradation is a significant problem in the field of communications. Any real communications channel has transmission deficiencies, including various kinds of noise and interference, which distort the signal. For example, static noise (caused by natural electric disturbances in the atmosphere) and thermal noise (caused by the random motion of electrons in the channel) are present to some extent in any communications channel. Intersymbol interference (degradation caused by imperfect channels) can also be a major problem. In short, there are many reasons why a signal that is sent may be unrecognizable when it is received.

Thus, transmission deficiencies must be corrected so that the signal received is the same as the one that was sent, and valuable information is not lost. This correction can be accomplished by the signal receiver, through a process known as equalization.

Equalization is the process of correcting a channel for its transmission deficiencies, by introducing networks which compensate for attenuation and time delay problems in the signal. A properly equalized communications channel will significantly increase the likelihood of obtaining an accurate signal (i.e., the signal that was sent) at the receiving end of a communications network. An "equalizer" is a device used to accomplish equalization.

A filter can be used as an equalizer. Further, a filter may have a means of monitoring its own frequency response characteristics and a means of varying its own parameters by closed loop action, in order to attain optimal equalization. Such a self-adjusting filter is called an "adaptive filter," and it can be used in a channel receiver to attain "adaptive equalization." The parameters of an adaptive filter are typically adjusted by sampling the filter output at a predetermined rate, and sending this sampled output to some filter control means, which adjusts filter parameters accordingly via closed loop feedback.

Commonly, a feed forward equalizer having weighted summed delayed versions of an input signal are used to derive an error signal for adaptively equalizing the input signal, e.g., remedying intersymbol interference. However, whenever such a design is implemented in an analog form, the adaptive equalizer becomes large and therefore difficult to implement. Other analog equalizers have not provided the adaptive equalization needed for accurate data communication.

It can be seen then that there is a need for an analog equalizer that is easily implemented and which is truly adaptive.

It can also be seen that there is a need for an analog adaptive equalizer that provides convergence of an error signal to provide truly adaptive error correction.

SUMMARY OF THE INVENTION

To overcome the limitations in the prior art described above, and to overcome other limitations that will become apparent upon reading and understanding the present specification, the present invention discloses an analog adaptive equalizer.

The present invention solves the above-described problems by providing an analog adaptive equalizer that provides convergence of an error signal by decoupling the error canceller, the automatic gain control and the filter to provide truly adaptive error correction.

A system in accordance with the principles of the present invention includes an automatic gain control (AGC) circuit for providing broadband amplification of an input signal to generate an AGC output signal, a filter for receiving the AGC output signal and providing high frequency signal conditioning to generate a filter output signal, an error detection circuit for generating an error signal representing the difference between the filter output signal and an expected output signal and a calculator for receiving the error signal and providing a gain correction signal to the automatic gain circuit to adjust the gain of the automatic gain circuit and a filter control signal to adjust the frequency range of the filter, the gain correction signal and the filter control signal being used to cancel the error signal.

One aspect of the present invention is that the calculator further comprises a first in, first out buffer for providing a history of the expected output signal to the calculator.

Another aspect of the present invention is that the filter has a fixed direct current (D.C.) response.

Another aspect of the present invention is that the filter has a transfer function according to:

$$H(s) = \frac{A \cdot S + \omega_0^2}{S^2 + \frac{\omega_0}{Q} \cdot S + \omega_0^2} \; ;$$

where $\omega_0$ and Q are fixed and A is a variable.

Another aspect of the present invention is that the filter control signal is a signal to adjust the value of A.

Yet another aspect of the present invention is that the filter comprises means for providing an output that changes monotonically as a function of the filter control signal.

Another aspect of the present invention is that the calculator further comprises determining means for identifying the source of the error signal.

Another aspect of the present invention is that the determining means associates a recent data level change with a filter error and generates a filter control signal to minimize the error signal in response thereto.

Another aspect of the present invention is that the determining means associates an error signal associated with a stable data level for a predetermined period with a gain error if the error signal is moving oppositely to either the filter output or the expected output signal.

Another aspect of the present invention is that the predetermined period comprises two data bits.

Still another aspect of the present invention is that a direct current voltage offset generator is provided for equalizing the input signal.

Another aspect of the present invention is that the error detection means comprises a slicer for slicing the filter output signal to generate a sliced signal having the expected output signal and subtracting means for subtracting the filter output signal from the sliced signal to generate the error signal.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 4a illustrates a graph of an equalized signal;

FIG. 4b illustrates a graph of the sliced signal; and

FIG. 4c illustrates a graph of the resulting error signal.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides an analog adaptive equalizer for data error correction.

Figure 1:
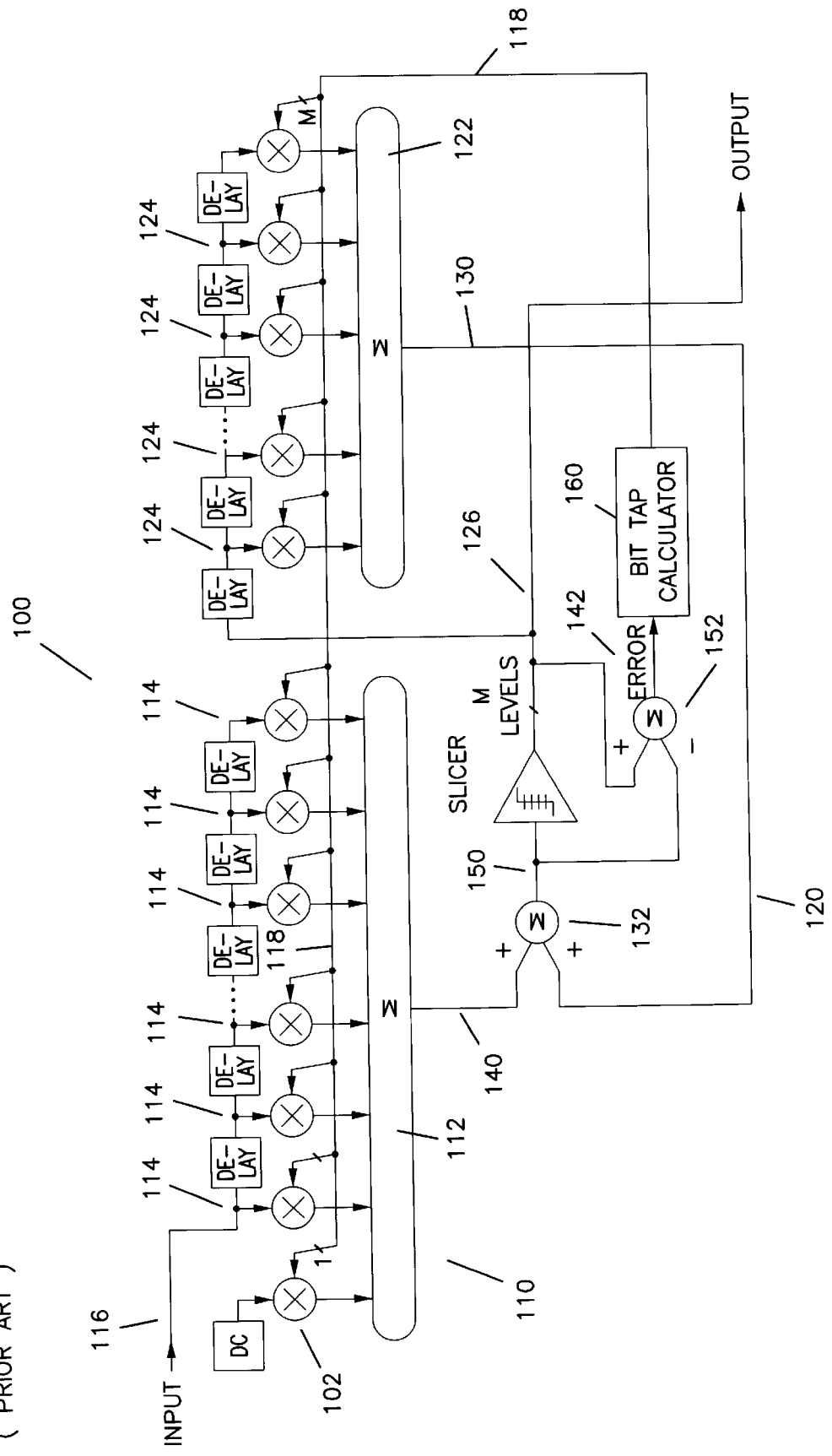
FIG. 1 illustrates a commonly used circuit for adaptive equalization.

FIG. 1 illustrates a commonly used circuit 100 for adaptive equalization. In FIG. 1, one tap 102 is used for offset cancellation. A feed forward equalizer 110 is implemented by summing 112 delayed versions 114 of the input 116. Each of the delayed versions 114 are weighted by tap coefficients 118 via a signal bus. A decision feedback equalizer 120 is implemented by summing 122 delayed versions 124 of the sliced output 126. These delayed versions 124 of the sliced output 126 are also weighted by the tap coefficients 118. The sum 130 of the delayed versions 124 of the sliced output 126 is summed 132 with the actual output 140 of the feed forward equalizer 110. The output 150 of this sum 132 is subtracted 152 from the sliced output 126 to produce an error signal 142 which is used to calculate and update 160 the tap weights 118 so that the error is driven to zero.

Many variations of this structure have been implemented in both the analog and digital domains. When implemented in the analog domain, this adaptive equalizer can become large and the circuitry can be difficult to implement.

Figure 2:
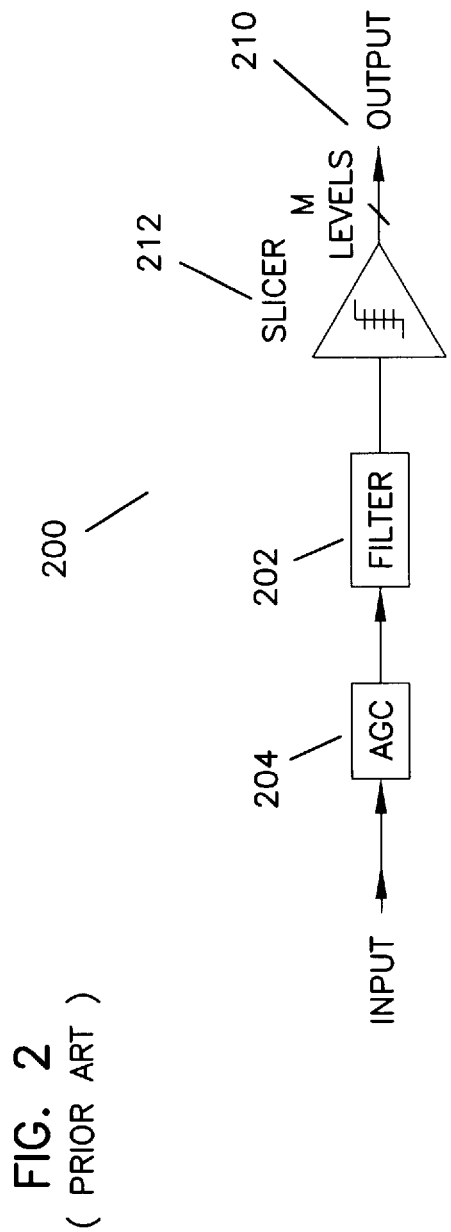
FIG. 2 illustrates a conventional analog equalizer.

A conventional analog equalizer 200 is shown in FIG. 2. In the analog equalizer 200 of FIG. 2, the filter 202 acts as the equalizer. The filter 202 is implemented with a passive, active, or switched-capacitor topology with the transfer function:

$$H(s) = \frac{A_M \cdot S^M + \ldots + A_1 \cdot S_1 + A_0}{B_N \cdot S^N + \ldots + B_1 \cdot S_1 + B_0};$$

where $A_0/B_0$ is fixed or $$H(z) = \frac{A_M \cdot Z^M + \ldots + A_1 \cdot Z_1 + A_0}{B_N \cdot Z^N + \ldots + B_1 \cdot Z_1 + B_0};$$

where $EA_M/EB_N$ is fixed.

This topology is attractive for analog circuits because it is easier to implement in analog than the topology 100 in FIG. 1. However, the analog equalizer 200 of FIG. 2 is not adaptive. This is evident by the interaction between the A and B terms in the transfer function and the AGC gain 204. Quasi-adaptive approaches have been used where coefficients for the filter 202 are set as a function of the output level 210 of the slicer 212. However, in these approaches, a knowledge of the transfer function that the filter 202 is trying to equalize is required. Nevertheless, these quasi-adaptive approaches do not tune out mismatches between assumed and actual response.

Figure 3:
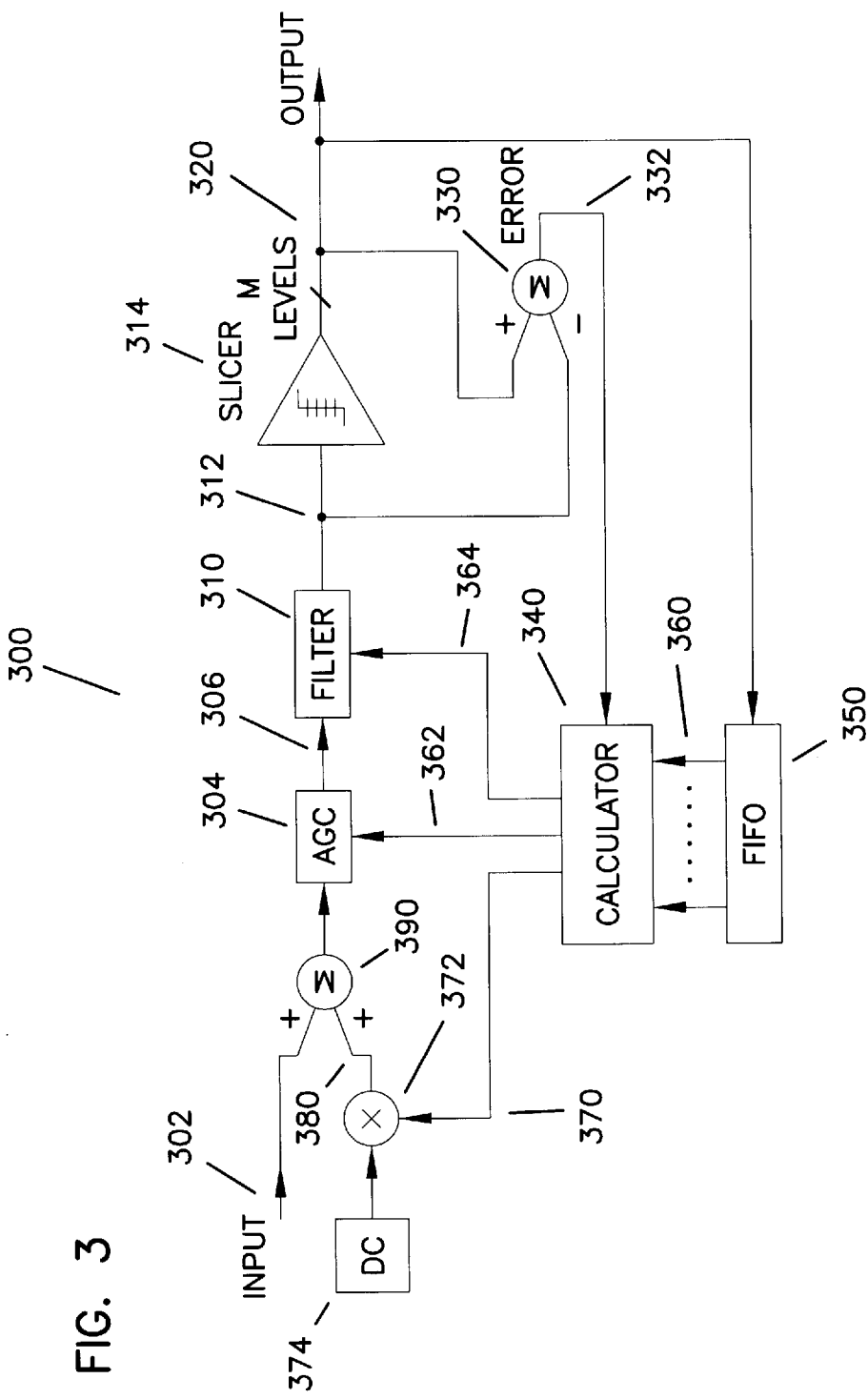
FIG. 3 illustrates an analog adaptive equalizer circuit according to the present invention.

The circuit 300 shown in FIG. 3 implements a modification to the circuit 200 shown in FIG. 2 which makes the circuit truly adaptive. In FIG. 3, an input signal 302 is adjusted by an automatic gain control (AGC) circuit 304. The AGC circuit 304 is used for broadband amplification. The output 306 of the AGC circuit 304 is passed through a filter 310. The filter 310 is devoted for high frequency conditioning. The output 312 of the filter 310 is passed through a bit slicer 314. The output 320 of the bit slicer 314 is compared 330 to the input 312 to the bit slicer 314 to generate an error signal 332. This error signal 332 is then passed to a calculator 340. The output 320 of the bit slicer 314 is also sampled and passed to a FIFO buffer 350 to accumulate a history 360 of the output 320. The output of the FIFO buffer 350 is fed to the calculator 340. The calculator 340 uses the error signal 332 and the output history 360 to generate control signals to the AGC circuit 362 and to the filter 364. In addition, the calculator 340 provides an input 370 to a multipication circuit 372 which also receives a D.C. component 374. The output 380 of the multipication circuit 372 is then summed 390 with the input 302.

For this topology 300 to converge properly, it is necessary to decouple the action of the offset canceller 372, the AGC 304, and the filter 310 so that they do not fight each other during convergence. According to the invention, a modification to the filter 310 and the calculator 340, using a running history 360 of the output 320, is required to provide proper convergence.

The filter 310 is set up with approximately fixed D.C. response. This allows the filter 310 to handle the high frequency signal conditioning, while the AGC 304 handles the broad-band frequency conditioning (gain scaling). Also, the filter 310 has only one control line 364. This control line 364 sweeps the filter 310 across a response range that reasonably closely equalizes the anticipated range of the media it is trying to compensate. This ensures that there is no opportunity for multiple high frequency controls to fight each other. It also limits the filter's 310 ability to do an exact equalization. However, the performance of the analog adaptive equalizer 300 is sufficient for most data communication applications. Lastly, the filter's 310 output level 312 must change monotonically as a function of control voltage. This ensures that the correction circuitry 340 knows which way to drive the filter 310 as a function of the error 332 it sees. One embodiment of the present invention may, for example, have a transfer function according to:

$$H(s) = \frac{A \cdot S + \omega_0^2}{S^2 + \frac{\omega_0}{Q} \cdot S + \omega_0^2} ;$$

where $\omega_0$ and Q are fixed and A is variable.

In addition, the calculator 340 according to the invention uses a running history 360 of the output 320 as well as the error 332. If a data error occurs evidenced by the error signal 332, then the generated error 332 is attributed to the filter 310 and the filter 310 is driven in a direction to reduce the error 332. If the data level has held constant for a number of bits, then the generated error 332 can be attributed to either an error caused by the AGC 304 or to an error caused by the DC offset 374. If both positive and negative output levels indicate the error is going in the same direction, the error 332 is attributed to DC offset 374 and the DC offset canceller 370 is driven in a direction to reduce the error. Otherwise, the error 332 is attributed to a gain error and the AGC 304 is driven in a direction to reduce the error.

FIG. 4a illustrates an equalized signal 400. In FIG. 4a the equalized signal 400 is an analog signal which varies over the sample period 402 between a +1 404 and -1 406 level. The equalized signal 400 is illustrated as beginning at a 0 level 410 for sample period N 412. At N+1 414, the equalized signal 400 has crossed through the plus threshold 416 and reached the +1 level 404. At N+2 420, the equalized signal 400 has returned to the 0 level 410. At N+3 422, the equalized signal 400 has crossed through the negative threshold 424 to reach the -1 level 406.

FIG. 4b illustrates the sliced signal 440. The sliced signal 440 is illustrated as beginning at a 0 level 450 for sample period N 452. At N+1 454, the sliced signal 440 has crossed through the plus threshold 456 and reached the +1 level 444. At N+2 460, the sliced signal 440 has returned to the 0 level 450. At N+3 462, the sliced signal 440 has crossed through the negative threshold 464 to reach the -1 level 446.

Finally, FIG. 4c illustrates the error signal 470. The error signal 470 represents the difference between the equalized signal 400 illustrated in FIG. 4a and the sliced signal 470 illustrated in FIG. 4b. The object of the analog adaptive equalizer according to the present invention is to ensure that the equalized signal 400 is exactly at +1, 0, or -1 levels when the signal is sampled at time equal to N 482, N+1 484, N+2 490, N+3 492, etc. This objective is met by ensuring that the error signal 470 is equal to zero 480 at these times. The error signal 470 according the invention is adjusted to nearly zero 480 at the sampling times by adjusting the D.C. offset, AGC control, and filter control as described herein. Thus, the invention allows for adaptive equalization of a conventional AGC/filter combination.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An analog adaptive equalizer, comprising:
    an automatic gain control (AGC) circuit for providing broadband amplification of an input signal to generate an AGC output signal;
    a filter, coupled to the automatic gain control circuit, for receiving the AGC output signal, the filter providing high frequency signal conditioning to generate a filter output signal;
    an error detection circuit, coupled to the filter, for generating an error signal representing the difference between the filter output signal and an expected output signal; and
    a calculator, coupled to the error detection circuit, for receiving the error signal and providing a gain correction signal to the automatic gain circuit to adjust the gain of the automatic gain circuit and a filter control signal to adjust the filter range of the filter, the gain correction signal and the filter control signal being used to minimize the error signal.

2. The analog adaptive equalizer of claim 1 wherein the calculator further comprises a first in, first out buffer for providing a history of the expected output signal to the calculator.

3. The analog adaptive equalizer of claim 1 wherein the filter has a fixed direct current (D.C.) response.

4. The analog adaptive equalizer of claim 1 wherein the filter has a transfer function according to:

$$H(s) = \frac{A \cdot S + \omega_0^2}{S^2 + \frac{\omega_0}{Q} \cdot S + \omega_0^2} ;$$

where $\omega_0$ and Q are fixed and A is a variable.

5. The analog adaptive equalizer of claim 4 wherein the filter control signal is a signal to adjust the value of A.

6. The analog adaptive equalizer of claim 1 wherein the filter comprises means for providing an output that changes monotonically as a function of the filter control signal.

7. The analog adaptive equalizer of claim 1 wherein the calculator further comprises determining means for identifying the source of the error signal.

8. The analog adaptive equalizer of claim 7 wherein the determining means associates a recent data level change with a filter error and generates a filter control signal to minimize the error signal in response thereto.

9. The analog adaptive equalizer of claim 7 wherein the determining means associates an error signal associated with a stable data level for a predetermined period with a gain error if the error signal is moving oppositely to either the filter output or the expected output signal.

10. The analog adaptive equalizer of claim 9 wherein the predetermined period comprises two data bits.

11. The analog adaptive equalizer of claim 1 further comprising a direct current voltage offset generator.

12. The analog adaptive equalizer of claim 11 wherein the calculator further comprises determining means for identifying the source of the error signal.

13. The analog adaptive equalizer of claim 1 wherein the error detection means comprises a slicer for slicing the filter output signal to generate a sliced signal having the expected output signal.

14. A method of adaptive equalizing a signal, comprising the steps of:

providing broadband amplification with an automatic gain control;

providing high frequency signal conditioning to a filter coupled to the automatic gain control circuit, to generate a filter output signal;

generating an error signal using an error detection circuit coupled to the filter, the error signal representing the difference between the filter output signal and an expected output signal; and creating a gain correction signal to the automatic gain circuit to adjust the gain of the automatic gain circuit to correct error originating from the automatic gain circuit; and producing a filter control signal to adjust the range of the filter to correct an error signal originating from the filter.

15. The method of claim 14 wherein the creating and producing steps further comprise the step of receiving a history of the expected output signal to determine the source of the error signal.

16. The method of claim 15 wherein the step of receiving the history of the output signal further comprises the steps of associating a recent data level change in the error signal with a filter error and generating the filter control signal in response thereto to minimize the error signal.

17. The method of claim 15 wherein the step of receiving the history of the output signal further comprises the steps of associating an error signal associated with a stable data level in the error signal for a predetermined period with a gain error if the error signal is moving oppositely to either the filter output or the expected output signal.

18. The method of claim 17 wherein the predetermined period comprises two data bits.

19. The method of claim 15 further comprising the step of providing a direct current voltage offset to the input signal.

20. The method of claim 14 wherein the filter has a fixed direct current (D.C.) response.

21. The method of claim 14 wherein the filter has a transfer function according to:

$$H(s) = \frac{A \cdot S + \omega_0^2}{S^2 + \frac{\omega_0}{Q} \cdot S + \omega_0^2} ;$$

where $\omega_0$ and Q are fixed and A is a variable.

22. The method of claim 21 wherein the step of producing the filter control signal comprises the step of adjusting the value of A.

23. The method of claim 14 wherein the step of generating an error signal further comprises the steps of slicing the filter output signal to generate a sliced signal representing the expected output signal.

* * * * *